(12) United States Patent
Watanabe et al.

(10) Patent No.: US 7,166,352 B2
(45) Date of Patent: *Jan. 23, 2007

(54) IMPACT-RESISTANT FILM FOR FLAT DISPLAY PANEL, AND FLAT DISPLAY PANEL

(75) Inventors: Hiroshi Watanabe, Osaka (JP); Shigemi Kumamoto, Osaka (JP); Takeomi Miyako, Chiba (JP); Hiroshi Wachi, Chiba (JP); Ken Moriwaki, Chiba (JP)

(73) Assignees: Asahi Glass Company, Limited, Tokyo (JP); Matsushita Electric Industrial Co., Ltd., Kadoma (JP)

( * ) Notice: Subject to any disclaimer, the term of this patent is extended or adjusted under 35 U.S.C. 154(b) by 333 days.

This patent is subject to a terminal disclaimer.

(21) Appl. No.: 10/370,509

(22) Filed: Feb. 24, 2003

(65) Prior Publication Data
US 2003/0211333 A1 Nov. 13, 2003

(30) Foreign Application Priority Data
Feb. 25, 2002 (JP) .............................. 2002-048153

(51) Int. Cl.
*B32B 7/02* (2006.01)
*B32B 7/12* (2006.01)
*B32B 9/04* (2006.01)
*H01J 1/62* (2006.01)

(52) U.S. Cl. .................. 428/220; 428/317.7; 428/325; 428/213; 428/451; 428/447; 313/489; 313/493; 313/582

(58) Field of Classification Search ............. 428/422.8, 428/220, 317.7, 354, 325, 300.7, 213, 451, 428/447; 313/489, 493, 582
See application file for complete search history.

(56) References Cited

U.S. PATENT DOCUMENTS

| | | | | |
|---|---|---|---|---|
| 4,310,600 A | * | 1/1982 | Cross | 428/447 |
| 4,533,566 A | * | 8/1985 | Evans et al. | 427/551 |
| 4,709,991 A | * | 12/1987 | Hoshikawa | 349/122 |
| 6,548,177 B2 | * | 4/2003 | Hieda et al. | 428/441 |

FOREIGN PATENT DOCUMENTS

| | | |
|---|---|---|
| DE | 44 18 074 | 7/1995 |
| EP | 1 134 072 | 9/2001 |
| JP | 8-220515 | 8/1996 |

OTHER PUBLICATIONS

Merriam-Webster's Collegiate Dictionary, Tenth Edition, Copyright 1999, pp. 871 and 1092.*
Patent Abstracts of Japan, JP 2001-266759, Sep. 28, 2001.
Patent Abstracts of Japan, JP 2002-023649, Jan. 23, 2002.
Patent Abstracts of Japan, JP 2000-112393, Apr. 21, 2000.

* cited by examiner

*Primary Examiner*—Rena Dye
*Assistant Examiner*—Lawrence Ferguson
(74) *Attorney, Agent, or Firm*—Oblon, Spivak, McClelland, Maier & Neustadt, P.C.

(57) ABSTRACT

An impact-resistant film for a flat display panel, which is an impact-resistant film to be bonded to a front glass of a flat display panel main body and which comprises a first layer on the front glass side of the flat display panel, made of a transparent thermosetting resin, and a second layer on the viewer's side of the first layer, made of a transparent synthetic resin having a shear modulus larger than the first layer.

12 Claims, 2 Drawing Sheets

IMPACT-RESISTANT FILM FOR FLAT DISPLAY PANEL, AND FLAT DISPLAY PANEL

The present invention relates to an impact-resistant film for a flat display panel, which is to be attached to the front glass of a flat display panel to prevent breakage of the front glass by an impact and at the same time to make the weight reduction and thickness reduction possible, and a flat display panel employing such a film.

In recent years, attention has been drawn to a plasma display panel (hereinafter referred to simply as PDP) which has merits such that a large screen panel can be prepared and clear full color display is possible. PDP is to provide a full color display in such a manner that phosphors are selectively discharged to emit light in a large number of discharge cells isolatedly formed between two glass plates.

Figure 1:
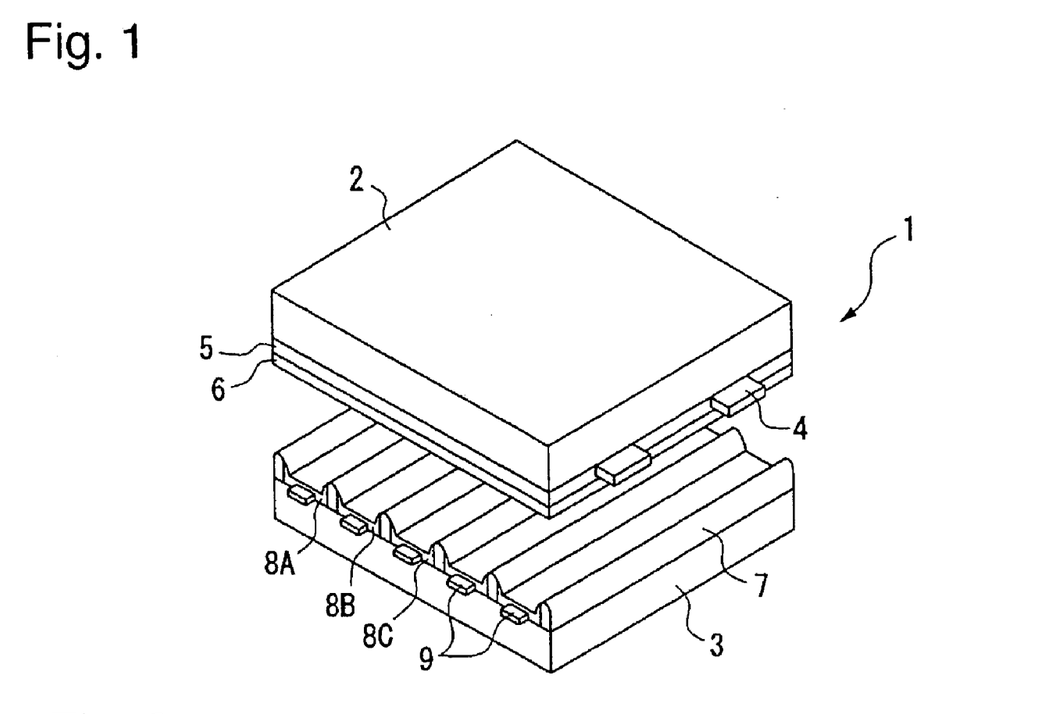
FIG. 1 is a perspective view of the main portion to illustrate the construction of PDP.

FIG. 1 is a view illustrating the structure of PDP. In this Fig., PDP shown by reference numeral 1 has a construction in which a front glass 2 and a rear glass 3 are disposed to face each other, and in the space between the two glasses 2 and 3, a rare gas such as xenon is sealed in a reduced pressure state. On the front glass 2, discharge electrodes 4, a dielectric film 5, a protecting film 6, etc. are formed, and on the rear glass 3, a partition wall 7, phosphors 8A, 8B, 8C, address electrodes 9, etc. are provided.

The front glass 2 of PDP1 receives scratches or strains at the time of forming or laminating electrodes or thin films made of various materials, and the strength is remarkably deteriorated as compared with the original glass plate. Further, it is in contact with irregularities of the phosphors or the partition wall formed on the rear glass, and the stress is likely to be concentrated at such contact portions.

Heretofore, in order to prevent breakage of the front glass of a flat display panel for e.g. PDP, it has been common to provide a protecting plate made of an acrylic resin or reinforced glass, with a space of a few mm in front of the front glass, to prevent an impact from being exerted to the flat display panel. However, such a protecting structure has had a problem such that it hinders weight reduction or thickness reduction of the flat display panel. Further, there is a space between the protecting plate and the front glass of the panel, whereby there has been a problem such that outside light of e.g. a fluorescent lamp is likely to be reflected to deteriorate the image quality, or the screen image is likely to be distorted by slight vibration.

Various techniques have been proposed to prevent breakage of the front glass of a flat display panel. For example, JP-A-2000-123751 proposes a technique to improve the strength by making the thickness of the front glass thick. However, with this structure, the protecting effect against impact is inadequate, and it increases the weight of the panel, such being problematic.

Further, JP-A-2000-156182, JP-A-11-119667, JP-A-11-119668 and JP-A-11-119669 propose a structure in which a protecting plate is bonded to the front glass of a panel via an adhesive layer. However, with this structure, the impact is likely to be transmitted to the front glass, and there has been a problem that no adequate effect to prevent breakage of the front glass can be obtained.

As a still another prior art, JP-A-2001-266759 proposes an impact-reducing laminate (hereinafter referred to as a conventional laminate) wherein two layers made of transparent synthetic resins i.e. a crack-preventing layer (impact-reducing layer) B and a scatter-preventing layer A thereon, are laminated on the front glass of a flat display panel via a transparent adhesive layer, and the shear modulus of the scatter-preventing layer A is at least $2\times10^8$ Pa and the shear modulus of the crack-preventing layer B is within a range of from $1\times10^4$ to $2\times10^8$ Pa.

However, such a conventional laminate was inadequate in imparting impact resistance to the front glass of e.g. PDP. In Examples in the publication, a so-called "non treated" glass plate having no electrodes or no thin films made of various materials laminated, is used as the glass plate, and the adhesive layer, the impact-reducing layer and the scatter-preventing layer are laminated sequentially thereon, and presence or absence of impact resistance is tested by dropping a hardball thereon. However, as mentioned above, with a real front glass of PDP, as a result of lamination of electrodes or thin films made of various materials, the impact resistance is remarkably deteriorated as compared with non-treated glass and is susceptible to breakage. Therefore, with such a conventional laminate, it has not been proved that adequate impact resistance can be obtained when bonded to the front glass of PDP, of which the impact resistance is substantially deteriorated as compared with a non-treated glass plate.

As described in detail in Examples given hereinafter, in a case where three layers of the same materials and thicknesses as disclosed in Examples of the publication, were laminated on a glass substrate assumed to be the front glass of PDP by forming electrodes and a dielectric film on a glass plate, and the impact resistance was measured by exerting a prescribed impact force by a spring impact, it was found that such a laminate was inadequate in the impact resistance (see Example 7 given hereinafter).

Thus, the conventional laminate was inadequate as an impact resistant film to protect the front glass of a flat display panel such as PDP, having the impact resistance deteriorated.

It is an object of the present invention to provide an impact-resistant film for a flat display panel (hereinafter referred to simply as an impact-resistant film) which can be attached to the front surface of the flat display panel to prevent breakage and scattering of glass of the panel upon receipt of an impact and whereby weight reduction and thickness reduction are possible, and to provide a flat display panel employing such a impact-resistant film.

To accomplish the above object, the present invention provides an impact-resistant film for a flat display panel, which is an impact-resistant film to be bonded to a front glass of a flat display panel main body and which comprises a first layer of from 0.1 to 4.0 mm in thickness on the front glass side of the flat display panel, made of a transparent thermosetting resin, and a second layer on the viewer's side of the first layer, made of a transparent synthetic resin having a shear modulus larger than the first layer.

The impact-resistant film of the present invention is one having the first layer made of a soft thermosetting resin provided between the front glass and the second layer made of a hard synthetic resin, and upon receipt of an impact, the impact will be absorbed by the first layer provided between the front glass and the hard second layer, whereby transmission of the impact force to the front glass can be prevented. Thus, it is possible to provide an impact-resistant film which is light in weight, thin and excellent in impact resistance.

The impact-resistant film of the present invention preferably has a structure in which the second layer is laminated on the viewer's side surface of the first layer.

Further, the above first layer is preferably made of a polyurethane resin or silicone resin having an adhesive property, to be bonded directly on the front glass of the flat display panel.

It is preferred that the first layer has a shear modulus of less than $1×10^8$ Pa and a thickness of from 0.1 to 4.0 mm.

Further, it is preferred that the second layer has a shear modulus of at least $1×10^8$ Pa and a thickness of 0.05 to 3.0 mm.

Further, the impact-resistant film of the present invention may have a structure wherein at least one layer selected from the group consisting of an infrared absorbing layer, an electromagnetic wave-shielding layer and an antireflection layer, and an adhesive layer bonding such layers, are laminated on the viewer's side of the second layer.

Further, the present invention provides a flat display panel having the above-mentioned impact-resistant film for a flat display panel bonded on its front glass directly or via a transparent adhesive layer.

Now, the present invention will be described in detail with reference to the preferred embodiments.

Figure 2:
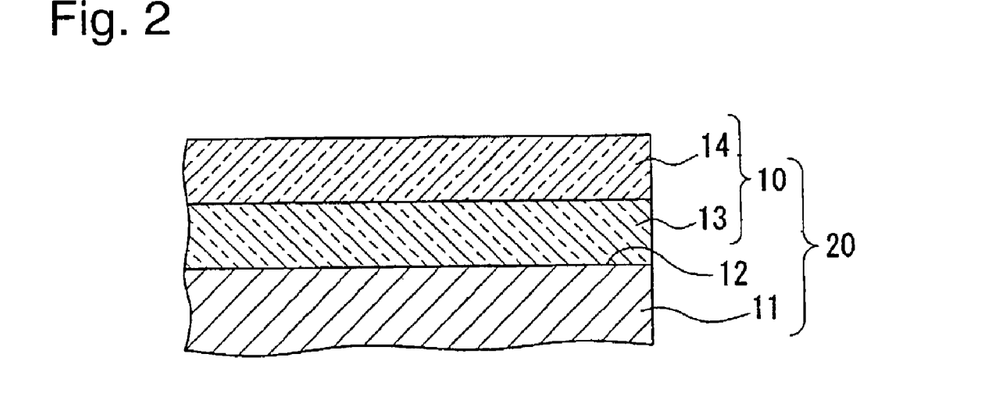
FIG. 2 is a cross-sectional view showing one embodiment of the impact-resistant film and the flat display panel, of the present invention.

FIG. 2 is a view illustrating one embodiment of the impact-resistant film of the present invention. This impact-resistant film 10 preferably comprises a first layer 13 made of a transparent thermosetting resin having a shear modulus G' in the measurement of dynamic viscoelasticity (hereinafter referred to simply as a shear modulus) of less than $1×10^8$ Pa and having a thickness of 0.1 to 4.0 mm as provided on the front glass 12 side of a flat display panel main body 11, and a second layer 14 made of a transparent synthetic resin having a shear modulus of at least $1×10^8$ Pa i.e. larger than the first layer and having a thickness of from 0.05 to 3.0 mm as laminated on the viewer's side of the first layer 13.

The above-mentioned shear modulus (G') is a value of the shear modulus G' measured at $25°$ C.$±3°$ C. at a frequency of 1 Hz by means of a dynamic viscoelasticity measuring apparatus DMS120, manufactured by Seiko Instruments Inc. Further, generally, there is a relation such that the tensile modulus E=3G' (shear modulus), and thus, the tensile modulus E is about 3 times the above-mentioned shear modulus.

First Layer

The first layer 13 to be provided on the front glass 12 side of the flat display panel main body 11, is made of a transparent thermosetting resin having a shear modulus of less than $1×10^8$ Pa, preferably within a range of from $1×10^3$ Pa to $1×10^7$ Pa, particularly preferably from $4×10^3$ Pa to $6×10^5$ Pa. As such a thermosetting resin, a urethane resin, a silicone resin, a phenol resin, a urea resin, an epoxy resin, a melamine resin, an unsaturated polyester resin or an alkyd resin may, for example, be optionally selected for use alone or in the form of a blend or copolymer of two or more different resins. However, a urethane resin and a silicone resin are most preferred, taking into consideration the balance of the impact resistance, the property to prevent scattering of broken glass, the transparency, the self-restoring property, the heat resistance, the durability, etc. By using such a thermosetting resin, even when the impact-resistant film 10 is applied to PDP whereby the front glass 12 is exposed to a relatively high temperature, the excellent impact-resistance can be maintained for a long period of time without such a trouble that the first layer 13 in contact with the front glass 12, will melt and flow.

The shear modulus of this first layer 13 is preferably less than $1×10^8$ Pa, more preferably within a range of from $1×10^3$ Pa to $1×10^7$ Pa, particularly preferably within a range of from $4×10^3$ Pa to $6×10^5$ Pa. By adjusting the shear modulus within the above range, it is possible to efficiently disperse and absorb and reduce the impact force transmitted from the second layer 14 side towards the front glass 12, thereby to prevent breakage of the front glass 12 of the flat display panel main body 11, and thus the effect to prevent breakage can be increased. Further, by setting a material having a shear modulus within the above range, handling at the time of laminating the first layer will be easy, and it is also advantageous that a layer having a stabilized shape can be formed.

Further, among thermosetting resins having a shear modulus within the above range, one having an adhesive property, e.g. a silicone film manufactured by GELTEC Co., Ltd. i.e. a resin material known by a tradename α-GEL, θ-5,θ-6,θ-7 or θ-8,is preferred, since it can simply be laminated on the viewer's side surface of the front glass 12 by placing it on the viewer's side surface of the front glass 12, placing the second layer 12 thereon, followed by press treatment by means of e.g. a rubber roll, whereby the production process can be substantially simplified. In a case where the adhesive property of the first layer 13 is not adequate, it is possible to provide a transparent adhesive layer on both sides of the first layer 13 to carry out bonding to the front glass 12 and to the second layer 14. It is preferred to use such an adhesive agent, since it is thereby possible to further improve the impact resistance.

The thickness of the first layer 13 is from 0.1 to 4.0 mm, preferably from 1.0 to 4.0 mm, more preferably from 1.5 to 3.0 mm. When the first layer 13 is at least 0.1 mm, the impact force can efficiently be dispersed and reduced. Further, it is preferred to adjust the thickness to be at most 4.0 mm, since the processability will be excellent, and such will be economically advantageous.

The first layer 13 may further contain a leveling agent, a defoaming agent, a color-adjusting colorant, a near infrared absorbing (reflecting) colorant, an antistatic agent, a heat stabilizer, an antioxidant, a dispersing agent, a flame retardant, a lubricant, a plasticizer, an ultraviolet absorber, etc. Further, between the first layer 13 and the second layer 14, a layer containing a color-adjusting colorant, a near infrared absorbing (reflecting) colorant, an antistatic agent, an ultraviolet absorber or the like, may be interposed.

In a case where a thermosetting resin such as a urethane resin or a silicone resin is used as the material for the above first layer 13, the first layer 13 having a proper thickness may be formed by means of a coating method such as a dip coating method, a spray coating method, a spinner coating method, a bead coating method, a wire bar coating method, a blade coating method, a roll coating method, a curtain coating method, a slit die coater method, a gravure coater method, a slit reverse coater method, a microgravure coater method or a comma coater method, an extrusion molding method, a calender roll molding method, or a batch molding method. In order to improve the processability, the above thermosetting resin may be diluted with an organic solvent such as toluene, MEK, ethyl acetate, methylene chloride or an alcohol, and then coated. For the first layer 13, a film obtainable by coating the above thermosetting resin on a suitable substrate, may be used. Otherwise, it may be directly coated on the viewer's side surface of the front glass 12 or on the front glass side surface of the second layer 14. After the coating, the thermosetting resin is subjected to removal of the organic solvent and thermosetting operation.

Second Layer

The second layer 14 is made of a transparent synthetic resin having a shear modulus higher than the shear modulus of the material for the above first layer 13, preferably a transparent synthetic resin having a shear modulus of at least $1 \times 10^8$ Pa, more preferably within a range of from $2 \times 10^8$ Pa to $1 \times 10^{10}$ Pa. In this embodiment, it is directly laminated on the viewer's side surface of the first layer 13. Such a second layer 14 may, for example, be made of a polyester resin such as polyethylene terephthalate, polyethylene naphthalate or polybutylene terephthalate, a cellulose ester resin such as diacetyl cellulose, triacetyl cellulose, propionyl cellulose, butyryl cellulose or nitrocellulose, a polyamide resin, a polycarbonate resin, a polyallylate resin, a polystyrene resin, an ethylene/vinyl acetate copolymer resin, a polyolefin resin such as polypropylene or polymethylpentene, an acrylic resin, a polyether ketone resin, a polyurethane resin, or a polyetherimide resin. Particularly preferred are a polyester resin and a polycarbonate resin, which are excellent in impact resistance.

The thickness of the second layer 14 is preferably from 0.05 to 3.0 mm, more preferably from 0.1 to 2.0 mm, particularly preferably from 1.0 to 2.0 mm. By adjusting the thickness of the second layer 14 within the above range, not only the impact resistance can be improved, but also the operation efficiency in bonding will be improved. Further, by adjusting the shear modulus of the second layer 14 to be at least $1 \times 10^8$ Pa, preferably within a range of from $2 \times 10^8$ Pa to $1 \times 10^{10}$ Pa, it is possible to obtain an impact-resistant film having adequate impact resistance in a state laminated with the first layer 13. In a case where the first layer 13 is formed on one side of the second layer 14 as a substrate, it is preferred to apply corona treatment or bonding-facilitating treatment on the surface of the second layer 14. This second layer 14 may contain a leveling agent, a defoaming agent, a color-adjusting colorant, a near infrared absorbing (reflecting) colorant, an antistatic agent, a heat stabilizer, an antioxidant, a dispersing agent, a flame retardant, a lubricant, a plasticizer, an ultraviolet absorber, etc.

The impact-resistant film 10 of a preferred embodiment of the present invention has a structure in which a first layer 13 on the front glass 12 side of a flat display panel 11, which is made of a transparent thermosetting resin having a shear modulus of less than $1 \times 10^8$ Pa and which has a thickness within a range of from 0.1 to 4.0 mm, and a second layer 14 on the viewer's side than the first layer 13, which is made of a transparent synthetic resin having a shear modulus of at least $1 \times 10^8$ Pa which is larger than the first layer, are laminated, so that the soft first layer 13 will be interposed between the front glass 12 and the second layer 14 made of a hard resin and having a thickness of from 0.05 to 3.0 mm, in such a state that the first layer 13 is bonded to the front glass 12 of the flat display panel main body 11. Accordingly, any impact transmitted from the second layer 14 to the front glass 12 side via the first layer 13 can be dispersed, and absorbed and reduced by the first layer 13, and it is thus possible to provide an impact-resistant film 10 which is capable of preventing transmission of the impact force to the front glass 12 and which is light in weight, thin and excellent in the impact resistance.

With respect to both the first layer and the second layer, the larger the thickness, the better the impact resistance. Accordingly, in a case where the thickness of the first layer is small, the thickness of the second layer may be made large, and a suitable combination may be adopted taking into consideration the required performance, operation efficiency, costs, etc. For example, when the thickness of the first layer is at least 0.1 mm and less than 1.0 mm, the thickness of the second layer is preferably at least 1.5 mm and at most 3.0 mm. Further, when the thickness of the second layer is at least 0.03 mm and less than 1.5 mm, the thickness of the first layer is preferably at least 1.0 mm and at most 4.0 mm.

As shown in FIG. 2, the flat display panel 20 of the present invention is constructed by bonding the above-described impact-resistant film 10 to the front glass 12 of a flat display panel main body 11. As described above, the impact-resistant film 10 may be laminated directly on the front glass 12 of the flat display panel main body 11. However, in a case where the adhesive property of the first layer 13 is not adequate, it can be easily bonded to the flat display panel main body 11 by providing a transparent adhesive layer. In a case where an adhesive is to be used, a commercially available adhesive may be employed. A specific example of a preferred adhesive may be an adhesive such as an acrylate copolymer, a polyvinyl chloride, an epoxy resin, a polyurethane, a vinyl acetate copolymer, a styrene/acryl copolymer, a polyester, a polyamide, a polyolefin, a styrene/butadiene copolymer rubber, a butyl rubber or a silicone resin. Further, in a case where an adhesive layer is to be laminated, it is preferred to bond a release film of e.g. PET having a silicone resin or a fluorinated resin coated, on the bonding surface, from the viewpoint of the operation efficiency. To such an adhesive, an additive having various functions, such as an ultraviolet absorber, a color-adjusting colorant, a near infrared-absorbing (reflecting) colorant, an electromagnetic wave-shielding agent, etc., may be added. As a method for bonding the impact-resistant film 10 to the flat display panel main body 11, a roll laminate method, a vacuum laminate method, an autoclave method, etc., may be employed.

Figure 3:
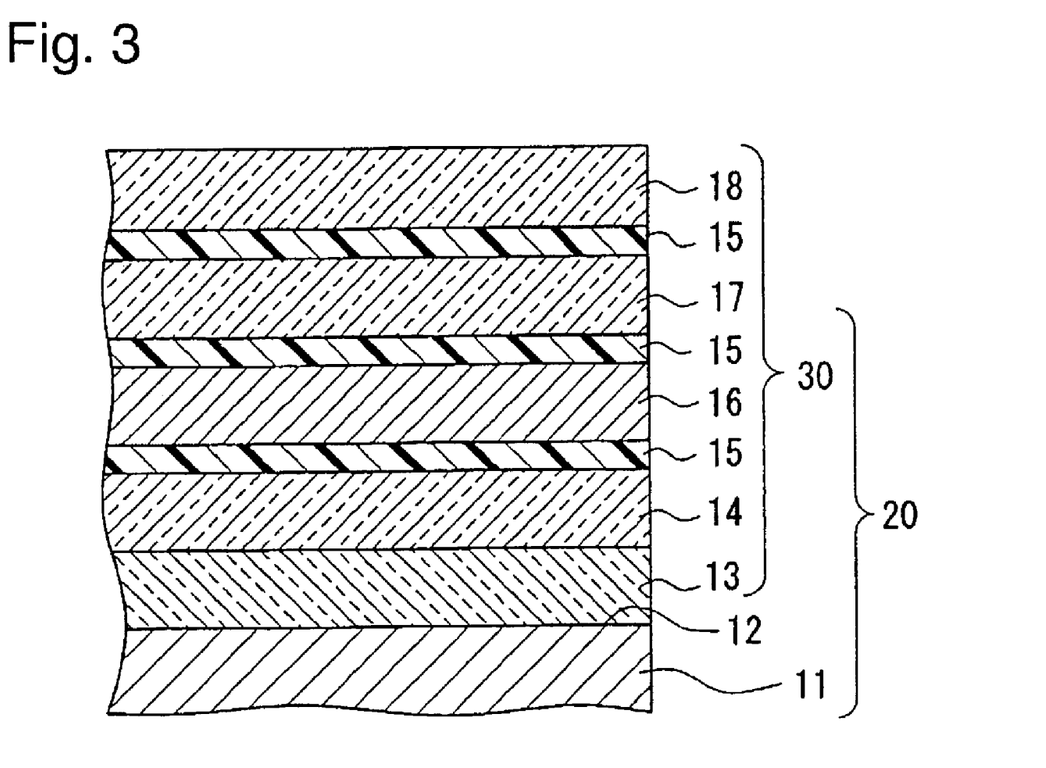
FIG. 3 is a cross-sectional view showing another embodiment of the impact-resistant film and the flat display panel, of the present invention.

The flat display panel main body 11 may be, in addition to PDP, a flat display panel such as a plasma address liquid crystal (PALC) display panel, a field emission display (FED) panel, a liquid crystal (LC) display panel, an electroluminescence (EL) display panel or a cathode ray tube display device (CRT). FIG. 3 is a view illustrating another embodiment of the impact-resistant film according to the present invention.

The impact-resistant film of the present invention may be constructed by laminating one or more layers having various functions on the viewer's side of the above-mentioned second layer 14. As such layers, a ultraviolet absorbing layer, a color-adjusting layer, a near infrared absorbing (reflecting) layer, an antifouling layer, a reflection-preventing layer, an electromagnetic wave-shielding layer, a hard coat layer and a layer to impart a scratch resistant function, may, for example, be mentioned.

As an example, the impact-resistant film 30 shown in FIG. 3 has a structure wherein on the viewer's side of the second layer 14, an electromagnetic wave-shielding layer 16, a near infrared absorbing layer 17 having both a near infrared absorbing function and a color-adjusting function, and an anti-reflection layer 18, are laminated sequentially via an adhesive layer 15. This example shows a preferred combination in a case where the flat display panel main body 11 is PDP. In an application to a flat display panel other than PDP or in a case where a electromagnetic wave-shielding function, a near infrared absorbing function and/or a color-adjusting function is already imparted to either the first layer 13 or the second layer 14, one or both of the electromagnetic wave-shielding layer 16 and the near infrared absorbing layer 17 may be omitted.

Details of the respective layers in this embodiment will be described below.

Electromagnetic Wave-Shielding Layer

The electromagnetic wave-shielding layer 16 is one to shield electromagnetic waves emitted from the PDP main body thereby to prevent an influence of electromagnetic noises to other household electric appliances and equipment, etc. As the electromagnetic wave-shielding layer 16 for PDP, an electroconductive layer made of an electroconductive metal mesh, or a light transmitting electroconductive layer made of a metal film of from 5 to 20 nm formed by means of a thin film-forming technique such as sputtering or an electroconductive multilayer film having such a metal film and an oxide laminated in a multilayer structure, can be employed. For the electroconductive layer made of an electroconductive metal mesh, various mesh materials which have been well known as electromagnetic wave-shielding meshes for PDP, can be employed. Such mesh materials are also disclosed, for example, in JP-A-11-212475, JP-A-2000-156182 and JP-A-2000-286593.

As the metal layer to be used for the light transmitting electroconductive layer, preferred is a layer made of at least one metal selected from the group consisting of Au, Ag and Cu or a layer containing such a metal as the main component. It is particularly preferred to use a metal layer containing Ag as the main component, since the resistivity is small, and the absorption is small. Further, as the metal layer containing Ag as the main component, a metal layer containing Ag as the main component and further containing at least one of Pd, Au and Cu, is preferred, since diffusion of Ag is suppressed, and consequently, the moisture resistance will be improved. The proportion of the content of at least one of Pd, Au and Cu is preferably from 0.3 to 10 atomic %, based on the total content of Ag and at least one of Pd, Au and Cu. When it is at least 0.3 atomic %, the effect to stabilize Ag can be obtained, and at the same time when it is at most 10 atomic %, it is possible to secure a good film-forming rate and visible light transmittance, while maintaining good moisture resistance. From such a viewpoint, the proportion is more preferably at most 5.0 atomic %. Further, the cost of the target remarkably increases as the proportion increases, and taking into usually required moisture resistance into consideration, the proportion is particularly preferably within a range of from 0.5 to 2.0 atomic %. In a case where such a light transmitting conductive layer is to be formed in a single layer, the thickness of such a metal layer is usually from 5 to 20 nm, preferably from 5 to 15 nm. The method for forming such a metal layer is not particularly limited, but it is preferred to form a thin metal film uniformly directly on one side of a transparent substrate by means of a sputtering method for film forming.

As such an electroconductive layer, it is preferred to employ a multilayer electroconductive film having an oxide layer and a metal layer laminated alternately on a suitable transparent substrate such as a transparent synthetic resin film, particularly a multilayer electroconductive film having them laminated alternately in the order of an oxide layer, a metal layer, an oxide layer . . . in a total of (2n+1) layers (wherein n is an integer of at least 1), whereby a low sheet resistance, a low reflectance and a high visible light transmittance can be obtained. The oxide layer may be a layer containing, as the main component, an oxide of at least one metal selected from the group consisting of Bi, Zr, Al, Ti, Sn, In and Zn. Preferably, it is a layer containing, as the main component, an oxide of at least one metal selected from the group consisting of Ti, Sn, In and Zn. Particularly preferred is a layer containing ZnO as the main component, whereby the absorption is small, and the refractive index is about 2, or a layer containing $TiO_2$ as the main component, whereby a preferred color tone can be obtained in a small number of layers. The oxide layer may be composed of a plurality of thin oxide layers. For example, instead of an oxide layer containing ZnO as the main component, it may be composed of a layer containing $SnO_2$ as the main component and a layer containing ZnO as the main component. The oxide layer containing ZnO as the main component is preferably an oxide layer comprising ZnO, which contains at least one metal other than Zn. Such an at least one metal contained, is present mainly in the state of an oxide in the oxide layer. ZnO containing at least one metal is preferably ZnO containing at least one metal selected from the group consisting of Sn, Al, Cr, Ti, Si, B, Mg and Ga. The proportion of the content of such an at least one metal is preferably from 1 to 10 atomic %, based on the total amount of Zn and the total of such metals, whereby the moisture resistance of the resulting electroconductive film will be improved. When it is at least 1 atomic %, it is possible to sufficiently reduce the internal stress of the ZnO film thereby to obtain good moisture resistance. Further, when it is at most 10 atomic %, the crystallinity of ZnO can be maintained well, and at the same time, the compatibility with the metal layer will not deteriorate. In order to obtain a ZnO film having a low internal stress constantly with good reproducibility and taking the crystallinity of ZnO into consideration, the proportion of the content of such a metal is preferably from 2 to 6 atomic %.

The geometrical thicknesses (hereinafter referred to simply as the thicknesses) of the oxide layers are preferably such that the thickness of an oxide layer closes to the transparent substrate and an oxide layer remotest from the transparent substrate is from 20 to 60 nm (especially from 30 to 50 nm), and the thickness of other oxide layers is from 40 to 120 nm (especially from 40 to 100 nm). The total thickness of the metal layers is preferably from 25 to 40 nm (especially from 25 to 35 nm) when the desired resistance of the resulting electroconductive layer is 2.5 Ω/□ or from 35 to 50 nm (especially from 35 to 45 nm) when the desired resistance is 1.5 Ω/□. The entire total thickness of the oxide layers and the metal layers is preferably from 150 to 220 nm (especially from 160 to 200 nm) when the number of metal layers is 2, from 230 to 330 nm (especially from 250 to 300 nm) when the number of metal layers is 3, or from 270 to 370 nm (especially from 310 to 350 nm) when the number of metal layers is 4.

Another layer (hereinafter referred to as an oxidation barrier layer) to prevent oxidation of metal layers may be provided between the first metal layer and the second oxide layer, between the second metal layer and the third oxide layer, or between the third metal layer and the fourth oxide layer, at the time of forming oxide layers. As such an oxide barrier layer, a metal layer, an oxide layer or a nitride layer may, for example, be used. Specifically, it may be at least one metal selected from the group consisting of Al, Ti, Si, Ga and Zn, or an oxide or nitride of such a metal. Preferably, ZnO containing Ti or Si, and Ga, is used. The thickness of the oxidation barrier layer is preferably from 1 to 7 nm. If it is thinner than 1 nm, it shows no adequate action as a barrier layer. If it is thicker than 7 nm, the transmittance of the film system tends to deteriorate.

To this electromagnetic wave-shielding layer 16, an electrode for connection to a ground lead (not shown) is connected which leads an electric current generated in that layer caused by electromagnetic waves emitted from the PDP main body, to the ground lead. The shape or size of this electrode is not particularly limited, but the lower the resistance, the better from the viewpoint of the electromagnetic wave-shielding performance. This electrode is preferably provided along the entire periphery of the impact-resistant film 30, with a view to securing the electromagnetic wave-shielding effect of the light transmitting electroconductive film. As such an electrode, an electrode obtainable by coating e.g. an Ag paste (a paste comprising Ag and glass frit) or a Cu paste (a paste comprising Cu and glass frit), followed by baking, can be suitably employed. Further, it may have a construction which includes a long ground lead (not shown) connected to this electrode.

Near Infrared Absorbing Layer

The near infrared absorbing layer 17 is made of a transparent synthetic resin layer containing a colorant having a near infrared absorbing ability to absorb near infrared rays emitted from the PDP main body and a colorant having a color-adjusting ability. These colorants may be dyes or pigments. Here, "a colorant having a near infrared absorbing ability (hereinafter referred to as a near infrared absorbing agent)" may be a colorant capable of absorbing at least a part of light in a near infrared region (wavelength: 780 to 1,300 nm), and such a colorant may be a colorant having an adsorbing ability for other wavelength region such as visible light. Further, "a colorant having a color-adjusting ability (hereinafter referred to as a color-adjusting agent)" is a colorant capable of specifically absorbing light in a visible light wavelength region (wavelength: 380 to 780 nm), preferably light in a specific wavelength region (or a plurality of regions). The base synthetic resin to which the near infrared absorbing agent and the color-adjusting agent are to be incorporated, is not particularly limited, and various transparent thermoplastic synthetic resins or thermosetting synthetic resins may be employed. Further, the thickness of the layer is not particularly limited, but it is preferably from about 0.5 to 25 μm.

The near infrared absorbing agent may, for example, be a polymethine type, phthalocyanine type, naphthalocyanine type, metal complex type, aminium type, immonium type, diimmonium type, anthraquinone type, dithiol metal complex type, naphthoquinone type, indolphenol type, azo type or triallylmethane type compound, but is not limited thereto. For the purpose of absorbing heat radiation or preventing noises of an electronic equipment, a near infrared absorbing agent having a maximum absorption wavelength of from 750 to 1,100 nm is preferred, and a metal complex type, aminium type, phthalocyanine type, naphthalocyanine type or diimmonium type compound, is particularly preferred. The near infrared absorbing agents may be used alone or as a mixture of two or more of them.

The color-adjusting agent is employed to absorb a part a specific wavelength region of visible light thereby to improve the color of transmitting visible light. The color-adjusting agent which can be used in the present invention, may be a well known organic pigment or organic dye of e.g. an azo type, condensed azo type, diimmonium type, phthalocyanine type, anthraquinone type, indigo type, perinone type, perylene type, dioxazine type, quinacridone type, methine type, isoindolinone type, quinophthalone type, pyrrole type, thoindigo type or metal complex type, or an inorganic pigment. However, it is preferred to use one or more among colorants which are excellent in weather resistance and also excellent in the compatibility or dispersibility with the main agent of the near infrared absorbing layer 17, such as diimmonium type, phthalocyanine type and anthraquinone type colorants in a proper combination.

In a case where this impact-resistant film 30 is applied to PDP, by this near infrared absorbing agent, near infrared rays emitted from the display screen of PDP will be absorbed by the near infrared absorbing layer 17, whereby formation of noises to an electronic equipment can be prevented. Further, as the color-adjusting agent to be incorporated in the near infrared absorbing layer 17, it is preferred to incorporate one or more color-adjusting agents in combination to selectively absorb and attenuate extra-emitted colors (mainly in a wavelength region of from 560 to 610 nm) from a discharge gas such as a two component gas of neon and xenon, sealed in the PDP main body. By such colorant construction, among visible lights emitted from the display screen of PDP, extra lights attributable to luminescence of the discharge gas, will be absorbed and attenuated, and as a result, the display color of visible lights emitted from the display screen of PDP can be made closer to the intended display color, and it is possible to provide PDP which is capable of displaying natural colors. Among colorants which selectively absorb and attenuate extra-emitted colors from the above-mentioned discharge gas, as described above, there are some which have a function to absorb and attenuate near infrared rays.

Antireflection Layer

The antireflection layer 18 may be any layer having an antireflection property, and any known antireflection method may be employed. For example, it may be a layer subjected to an antiglare treatment or a layer having a low refractive index layer. With a view to preventing scattering of broken fragments when the highly rigid transparent substrate itself is broken by an accident, it is preferably one having a low refractive index layer on one side of a resin film. Particularly preferred is an antireflection layer having a low refractive index layer made of a non-crystalline fluoropolymer on one side of a polyurethane type flexible resin layer, and specifically, ARCTOP (tradename) manufactured by Asahi Glass Company, Limited, may, for example, be mentioned. Further, in order to impart abrasion resistance, a lubricant may be coated on the surface of the antireflection layer 18 as the outermost layer to such an extent not to impair the antireflection performance, or a lubricant may be incorporated in the antireflection layer 18. Such a lubricant may, for example, be a perfluoropolyether, such as KRYTOX, tradename, manufactured by Du Pont, DAIFLOIL, tradename, manufactured by Daikin Industries, Ltd., FOMBLIN, tradename, manufactured by Ausimont Inc., or FLON LUBE, tradename, manufactured by Asahi Glass Company, Limited.

In a case where a scattering-preventive and reflection-preventive resin film like the above-mentioned ARCTOP (tradename) as the antireflection layer 18, a near infrared absorbing agent may be incorporated in such a polyurethane resin layer to impart a near infrared shielding effect to the antireflection layer 18. Further, a pigment and/or dye which absorbs visible light having a specific wavelength, may be incorporated to impart a color-adjusting ability to adjust the color balance of the display color.

Adhesive Layer

A transparent adhesive layer 15 may be interposed for bonding between the above-described second layer 14 and the electromagnetic shielding layer 16, between the electromagnetic shielding layer 16 and the near infrared absorbing layer 17, and between the near infrared absorbing layer 17 and the antireflection layer 18. As a suitable adhesive, a hot melt type adhesive such as an ethylene vinyl acetate copolymer (EVA), or an ultraviolet curing type or thermosetting type adhesive of epoxy or acrylate type may be mentioned. The thickness of the adhesive layer 15 is usually from 0.1 to 1.0 mm, preferably from 0.2 to 0.5 mm.

The impact-resistant film 30 of this embodiment has such a construction that the soft first layer 13 is interposed between the front glass 12 and the second layer 14 made of a hard resin in such a state that the first layer 13 is bonded to the front glass 12 of the flat display panel main body 11, whereby the same effect as the impact-resistant film 10 of the previous embodiment can be obtained such that the impact exerted from the second layer 14 to the front glass 12 side via the first layer 13 will be dispersed, absorbed and reduced by the first layer 13, whereby transmission of the impact force to the front glass 12 can be prevented, and it is possible to provide an impact-resistant film which is light in weight, thin and excellent in the impact resistance. Further, on the viewer's side surface of the second layer 14, the electromagnetic wave-shielding layer 16, the near infrared absorbing layer 17 having a near infrared absorbing function and a color-adjusting function, and the antireflection layer 18, are laminated, whereby it can be applied particularly suitably to a display panel where noises by electromagnetic waves or near infrared rays will be formed, and it is desired to adjust the color balance of the display color, like PDP, as the flat display panel main body 11.

Now, the effects of the impact-resistant film of the present invention will be described in detail. Examples 1 to 7 represent Working Examples of the present invention, and Examples 8 to 10 represent Comparative

EXAMPLES

Example 1

Preparation of glass substrate: On a high strain glass (PD200,tradename, manufactured by Asahi Glass Company, Limited) having a thickness of 2.8 mm, transparent electrodes, bus electrodes, a transparent dielectric and a protecting film were sequentially laminated to prepare a glass substrate which simulated a front glass of PDP of 950 mm×540 mm. Such respective layers were prepared under the following conditions.

Transparent electrodes: ITO was formed into a film by a sputtering method, and then an electrode pattern was prepared by photolithography.

Bus electrodes: Three layers of Cr—Cu—Cr were formed by a sputtering method, and an electrode pattern was prepared by photolithography.

Transparent dielectric: Paste-like low melting glass was formed into a film by solid printing.

Protecting film: On the surface of the transparent dielectric, an adhesive (sealing) layer was formed by screen printing, and then MgO was formed into a film by a vapor deposition method.

100 Parts by mass of a silicone resin solution (SE1885A, tradename, manufactured by Dow Corning Toray Silicone Co., Ltd.) and 100 parts by mass of a curing agent for silicone resin (SE1885B, tradename, manufactured by Dow Corning Toray Silicone Co., Ltd.) were mixed and coated on the surface of a film made of a polycarbonate (LEXAN 8010,tradename, manufactured by Asahi Glass Company, Limited) and having a thickness of 1.0 mm by means of a bar coater so that the thickness would be 1.0 mm, followed by anneal treatment at 100° C. for 30 minutes. Thus, a film having a silicone resin was formed on the polycarbonate to obtain an impact-resistant film comprising the silicone resin and the polycarbonate. The shear modulus of the silicone resin and the polycarbonate was $4.0 \times 10^4$ Pa and $9.0 \times 10^9$ Pa, respectively. Here, the shear modulus of the polycarbonate was calculated from the tensile modulus. This impact-resistant film was placed on the above glass substrate surface so that the surface on the silicone resin layer side would be in contact with the glass substrate, and the polycarbonate layer was pressed at room temperature by means of a rubber roll for lamination to obtain a glass substrate provided with the impact-resistant film (hereinafter referred to as an impact-resistant glass substrate).

Using this impact-resistant glass substrate (Example 1), the impact test and the heat resistance test were carried out under the following conditions. The results are shown in Table 1.

Evaluation Method

Shear modulus G': Directly measured under such conditions that the frequency was 1 Hz and the temperature was 25° C., by means of a dynamic viscoelasticity measuring device ARES, manufactured by Rheometric Scientific Co. However, the shear modulus of the polycarbonate or the like, was obtained by measuring the tensile modulus (E) at a temperature of 25° C. by means of the above apparatus and calculating the shear modulus from the tensile modulus in accordance with the formula E=3G'. Unless otherwise specified, the shear modulus was directly measured by the above method.

Impact test: Using a spring impact hammer (Model F-22, manufactured by PTL Co. in Germany) disclosed in IEC standards (Publication 65. 1985), evaluation was carried out by impact forces of 0.2 J, 0.35 J, 0.50 J, 0.70 J and 1.00 J. Symbol ○ indicates a case where the test sample was not broken, and symbol X indicates a case where the test sample was broken. The impact energy when a polyamide-processed weight (radius: 10 mm, 250 g) stipulated in Electrical Appliance and Material Control Law, is dropped from a height of about 20.4 cm, corresponds to 0.50 J. Accordingly, if in this impact test, the test sample has an impact resistance of at least 0.50 J, it can be judged that the sample has a practically sufficient impact resistance.

The impact test was carried out by placing the impact-resistant glass substrate on an aluminum plate (10 mm in thickness×1,000 mm in length×600 mm in width), securing the four sides by a vise, and propping the assembly against a concrete wall.

Heat resistant test: The test sample was put into an oven of 80° C., and upon expiration of 1,000 hours, it was taken out, and the appearance was inspected. Symbol ○ indicates a case where there was no change as compared with before it was put into the oven, and symbol X indicates a case where the impact-resistant film was peeled from the glass substrate, or formation of air bubbles between the film and the glass substrate, or a distortion of the surface condition was observed.

Example 2

An impact-resistant glass substrate was prepared in the same manner as in Example 1 except that the thickness of the film made of the silicone resin in Example 1 was changed to 3.0 mm, and the same tests as in Example 1 were carried out. The results are shown in Table 1.

Example 3

65 Parts by mass of PREMINOL PML-3012 (tradename for a polyether type polyol manufactured by Asahi Glass Company, Limited), 28 parts by mass of EXCENOL EL-1030 (tradename for a polyether type polyol manufactured by Asahi Glass Company, Limited), 100 parts by mass of PREMINOL PML-1003 (tradename for a polyether type polyol manufactured by Asahi Glass Company, Limited), 30 parts by mass of hexamethylene diisocyanate, 0.2 part by mass of dibutyltin dilaurate and 2 parts by mass of an antioxidant (IRGANOX 1010,tradename, manufactured by Ciba Geigy) were mixed, defoamed and then cast on a polyethylene terephthalate film having release treatment applied and reacted at 80° C. for 20 minutes, to obtain a polyurethane film having a thickness of 2.0 mm. The shear modulus of this polyurethane film was $3.1 \times 10^5$ Pa.

On each side of this polyurethane film, an acryl type adhesive (a mixture of 150 parts by mass of SK dyne 1604N, tradename, manufactured by Soken Chemical & Engineering Co., Ltd. and 2 parts by mass of L-45, tradename, manufactured by Soken Chemical & Engineering Co., Ltd.) was coated by means of a bar coater, dried at 100° C. for 10 minutes and subjected to anneal treatment to obtain a polyurethane film having the acryl type adhesive laminated in a thickness of 0.015 mm on each side.

An impact-resistant glass substrate was prepared in the same manner as in Example 1 except that the film made of the silicone resin in Example 1 was changed to the polyurethane film, and the same tests as in Example 1 were carried out. The results are shown in Table 1.

Example 4

An impact-resistant glass substrate was prepared in the same manner as in Example 1 except that the thickness of the film made of the silicone resin in Example 1 was changed to 0.6 mm, and the thickness of the polycarbonate was changed to 1.5 mm, and the same tests as in Example 1 were carried out. The results are shown in Table 1.

Example 5

An impact-resistant glass substrate was prepared in the same manner as in Example 1 except that the thickness of the film made of the silicone resin in Example 1 was changed to 0.3 mm, and the thickness of the polycarbonate was changed to 1.5 mm, and the same tests as in Example 1 were carried out. The results are shown in Table 1.

Example 6

100 Parts by mass of a silicone resin solution (SD4560, tradename, manufactured by Dow Corning Toray Silicone Co., Ltd.) and 0.9 part by mass of a curing agent for silicone resin (SRX212,tradename, manufactured by Dow Corning Toray Silicone Co., Ltd.) were mixed to prepare a silicone adhesive.

The film made of the silicone resin formed in Example 1 was peeled from the polycarbonate, and on each side of this film made of the silicone resin, the above silicone adhesive was coated by means of a bar coater. It was dried at 100° C. for 10 minutes and subjected to anneal treatment to obtain a silicone resin film having the silicone adhesive laminated in a thickness of 0.015 mm on each side.

An impact-resistant glass substrate was prepared in the same manner as in Example 1 except that the film (the first layer) made of the silicone resin in Example 1 was changed to said silicone resin film, and the same tests as in Example 1 were carried out. The results are shown in Table 1.

Example 7

100 Parts by mass of a silicone resin solution (SE1885A, tradename, manufactured by Dow Corning Toray Silicone Co., Ltd.) and 100 parts by mass of a curing agent for silicone resin (SE1885B, tradename, manufactured by Dow Corning Toray Silicone Co., Ltd.) were mixed and coated on the surface of a polyethylene film (hereinafter referred to as PE1) having a thickness of 100 µm and having release treatment applied, by means of a bar coater, so that the thickness would be 0.3 mm and subjected to anneal treatment at 100° C. for 30 minutes to obtain a film made of the silicone resin formed on PE1. On the surface of this film made of the silicone resin, the silicone adhesive as used in Example 1 was laminated so that the thickness would be 0.015 mm, and the same polyethylene film as mentioned above (hereinafter referred to as PE2) was further laminated. PE1 was peeled, and also on the surface on the PE1 side of the silicone resin film, the silicone adhesive was laminated so that the thickness would be the same thickness of 0.015 mm as above. Thus, a silicone resin film having the silicone adhesive laminated on each side was obtained.

Then, the glass substrate prepared in Example 1, the silicone resin film having PE2 peeled and having the silicone adhesive laminated, and the above polycarbonate, were laid sequentially and laminated at room temperature by means of a rubber roll, to obtain the glass substrate provided with an impact-resistant film comprising the polycarbonate and the silicone resin film. Using this glass substrate, the same tests as in Example 1 were carried out. The results are shown in Table 1.

Example 8

Using the glass substrate having no impact-resistant film bonded, the impact test was carried out. The results are shown in Table 1.

Example 9

On one side of a film made of a polycarbonate (LEXAN 8010,tradename, manufactured by Asahi Glass Company, Limited) and having a thickness of 2.0 mm, an acryl type adhesive (a mixture of 150 parts by weight of SK dyne 1604N, tradename, manufactured by Soken Chemical & Engineering Co., Ltd. and 2 parts by mass of L-45, tradename, manufactured by Soken Chemical & Engineering Co., Ltd.) was laid in a thickness of 0.015 mm and laminated at room temperature by means of a rubber roll, so that the adhesive side was in contact with the glass substrate, to prepare a glass substrate provided with an impact-absorbing film, and the same tests as in Example 1 were carried out. The results are shown in Table 1.

Example 10

On each side of a polypropylene/EVA/polypropylene film (POVIC-T, tradename, manufactured by Achilles Corporation) having a thickness of 0.8 mm, an acryl type adhesive (a mixture of 150 parts by mass of SK dyne 1604N, tradename, manufactured by Soken Chemical & Engineering Co., Ltd. and 2 parts by mass of L-45,tradename, manufactured by Soken Chemical & Engineering Co., Ltd.) was laminated, and on one side thereof, a film made of a polyethylene terephthalate (COSMOSHINE A4300,tradename, manufactured by Toyobo Co., Ltd.) and having a thickness of 0.188 mm, was laminated at room temperature by means of a rubber roll.

The shear modulus of the polypropylene/EVA/polypropylene film and the polyethylene terephthalate film, as calculated from the tensile modulus, was $6.9 \times 10^7$ Pa, and $2.0 \times 10^9$ Pa, respectively. This impact-absorbing film and the above glass substrate were laminated at room temperature by means of a rubber roll so that the adhesive side of the impact-absorbing film would be in contact with the glass substrate, to prepare a glass substrate provided with the impact-absorbing film, and the same tests as in Example 1 were carried out. The results are shown in Table 1.

TABLE 1

|  | Impact force (unit: J) | | | | | Heat resistance |
| --- | --- | --- | --- | --- | --- | --- |
|  | 0.20 | 0.35 | 0.50 | 0.70 | 1.00 | |
| Ex. 1 | ○ | ○ | ○ | ○ | X | ○ |
| Ex. 2 | ○ | ○ | ○ | ○ | ○ | ○ |
| Ex. 3 | ○ | ○ | ○ | ○ | X | ○ |
| Ex. 4 | ○ | ○ | ○ | X | X | ○ |
| Ex. 5 | ○ | ○ | X | X | X | ○ |
| Ex. 6 | ○ | ○ | ○ | ○ | ○ | ○ |
| Ex. 7 | ○ | ○ | ○ | X | X | ○ |
| Ex. 8 | X | X | X | X | X | — |
| Ex. 9 | X | X | X | X | X | ○ |
| Ex. 10 | X | X | X | X | X | X |

As is evident from the results shown in Table 1, each of the impact-resistant films of Examples 1 to 7 of the present invention, had sufficient impact-resistance in such a state that it was bonded to a glass substrate prepared to simulate a front glass of PDP, to form an impact-resistant glass substrate.

On the other hand, the glass substrate of Example 8 having no impact resistant film bonded, had an impact resistance lower than 0.2 J.

Further, the impact-resistant glass substrate of Example 9 having a polycarbonate layer having a thickness of 2.0 mm (corresponding to the second layer) bonded to this glass substrate via a thin adhesive layer, had a impact resistance lower than 0.2 J. From this, it is apparent that the impact resistance can not be increased solely by the second layer, even if the thickness of the second layer is increased.

Further, the impact-resistant glass substrate of Example 10 having a laminate prepared to simulate a conventional laminate, bonded, had an impact resistance lower than 0.2 J, and the impact resistance was evidently inferior to each of the impact-resistant glass substrates of Examples 1 to 7 of the present invention. Further, in the impact resistant glass substrate of Example 10, a thermoplastic resin was used as the first layer, whereby the heat resistance was inadequate, such being undesirable as an impact-resistant film for PDP.

According to the present invention, it is possible to provide a flat display panel and an impact-resistant film for a flat display panel, which is bonded to a front glass of a flat display panel to prevent breakage of the glass by an impact and whereby weight reduction and thickness reduction are made possible.

The entire disclosure of Japanese Patent Application No. 2002-48153 filed on Feb. 25, 2002 including specification, claims, drawings and summary is incorporated herein by reference in its entirety.

What is claimed is:

1. A flat display panel having an impact-resistant film bonded on its front glass directly or via a transparent adhesive layer, wherein
the impact-resistant film comprises
a first layer of from 0.1 to 4.0 mm in thickness, made of at least one of a transparent thermosetting silicone resin and a transparent thermosetting phenol resin; and
a second layer on the viewer's side of the first layer, made of a transparent synthetic resin having a shear modulus larger than the first layer.

2. The flat display panel according to claim 1, wherein the first layer is made of the silicone resin.

3. A flat display panel having an impact-resistant film bonded on its front glass directly or via a transparent adhesive layer, wherein
the impact-resistant film comprises
a first layer of from 0.1 to 4.0 mm in thickness, made of at least one of a transparent thermosetting silicone resin and a transparent thermosetting phenol resin; and
a second layer laminated on the viewer's side of the first layer, made of a transparent synthetic resin having a shear modulus larger than the first layer.

4. The flat display panel according to claim 3, wherein the first layer is made of the silicone resin.

5. The flat display panel according to claim 3, wherein the first layer has a shear modulus of less than $1 \times 10^8$ Pa and a thickness of from 0.1 to 4.0 mm.

6. The flat display panel according to claim 3, wherein the second layer has a shear modulus of at least $1 \times 10^8$ Pa and a thickness of 0.05 to 3.0 mm.

7. A flat display panel having an impact-resistant film bonded on its front glass directly or via a transparent adhesive layer, wherein
the impact-resistant film comprises
a first layer of from 0.1 to 4.0 mm in thickness, made of at least one of a transparent thermosetting silicone resin and a transparent thermosetting phenol resin;
a second layer laminated on the viewer's side of the first layer, made of a transparent synthetic resin having a shear modulus larger than the first layer; and
at least one layer selected from the group consisting of an infrared absorbing layer, an electromagnetic wave-shielding layer and an antireflection layer, and an adhesive layer bonding such layers, laminated on the viewer's side of the second layer.

8. The flat display panel according to claim 7, wherein the first layer is made of the silicone resin.

9. The flat display panel according to claim 7, wherein the first layer has a shear modulus of less than $1 \times 10^8$ Pa and a thickness of from 0.1 to 4.0 mm.

10. The flat display panel according to claim 7, wherein the second layer has a shear modulus of at least $1 \times 10^8$ Pa and a thickness of 0.05 to 3.0 mm.

11. An impact-resistant film on a glass substrate, the impact-resistant film comprising
a first layer of from 0.1 to 4.0 mm in thickness and comprising at least one of a transparent thermosetting silicone resin and a transparent thermosetting phenol resin; and a second layer comprising a transparent synthetic resin, wherein the first layer is between the glass substrate and the second layer; and the shear modulus of the second layer is larger than the shear modulus of the first layer.

12. The impact-resistant film on a glass substrate according to claim 11, wherein the first layer comprises the silicone resin.

* * * * *